United States Patent
Arnold

Patent Number: 5,422,165
Date of Patent: Jun. 6, 1995

[54] EDGE-PROTECTED BELTING

[75] Inventor: Dale B. Arnold, Anthony, Kans.

[73] Assignee: Morrison Company, Inc., Anthony, Kans.

[21] Appl. No.: 74,919

[22] Filed: Jun. 10, 1993

[51] Int. Cl.⁶ ............................................. B32B 9/00
[52] U.S. Cl. ................................. 428/192; 428/110; 428/162; 428/174; 428/193; 428/247; 428/250; 428/252; 428/259; 428/287; 428/910; 198/847; 156/137
[58] Field of Search ............... 428/192, 193, 247, 250, 428/252, 110, 162, 174, 212, 287, 910, 259; 198/847

[56] References Cited

U.S. PATENT DOCUMENTS

| | | | |
|---|---|---|---|
| 676,565 | 6/1901 | Lindsay | 198/847 |
| 756,548 | 4/1904 | White | 198/847 |
| 975,560 | 11/1910 | Metzler | 198/847 |
| 1,698,035 | 1/1929 | Tobey | 198/847 |
| 1,781,750 | 11/1930 | Dodge et al. | 198/847 |
| 2,505,354 | 4/1950 | Gartrell et al. | 428/250 |
| 3,144,930 | 8/1964 | Michels | 198/847 |
| 3,485,707 | 12/1969 | Spicer | 428/250 |
| 3,900,627 | 8/1975 | Angioletti et al. | 428/114 |
| 4,184,589 | 1/1980 | Habegger | 428/162 |
| 4,279,676 | 7/1981 | Morrison et al. | 156/159 |
| 4,371,580 | 2/1983 | Morrison et al. | 428/250 |
| 4,518,647 | 5/1985 | Morrison | 428/252 |
| 4,900,609 | 2/1990 | Arnold | 428/163 |

Primary Examiner—Patrick J. Ryan
Assistant Examiner—A. Bahta
Attorney, Agent, or Firm—Arnold, White & Durkee

[57] ABSTRACT

Belts used in agricultural applications and particularly in round, hay balers have inherent problems created by their usual process of manufacture. This process involves cutting a large processed sheet of elastomeric into relatively narrow strips which form the core of the belts. The belt disclosed herein utilizes a wrap of fabric affixed around each longitudinal edge of the belt core. This wrapped belt core is then further processed to create belts with improved longevity and performance characteristics.

30 Claims, 3 Drawing Sheets

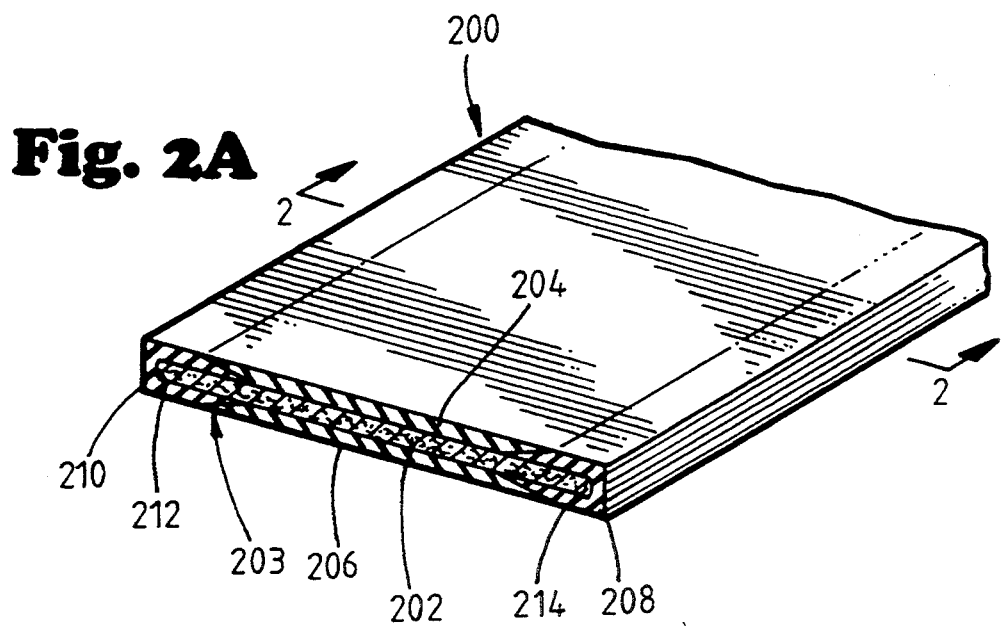
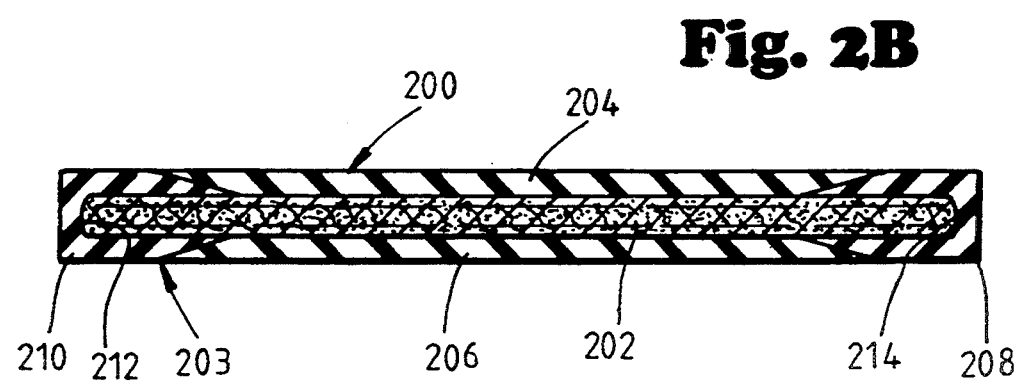
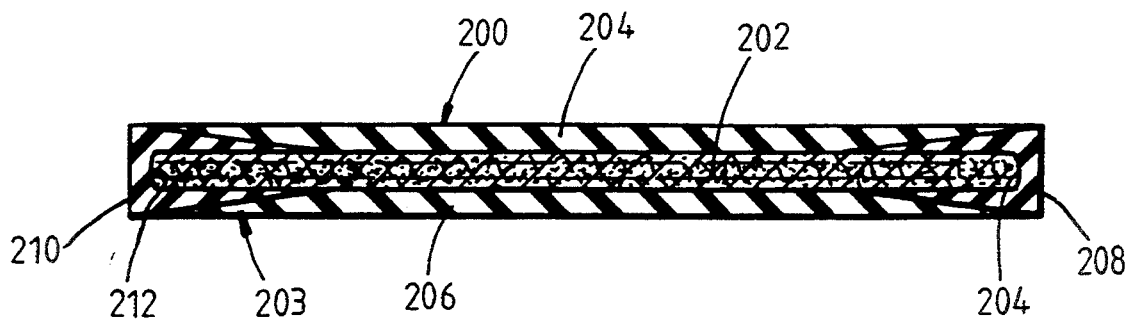

EDGE-PROTECTED BELTING

BACKGROUND OF THE INVENTION

The present invention relates to belting and, more particularly, to belting useful in round, hay balers.

In agricultural applications, belts are used for a wide variety of purposes, from transmitting power to conveying produce. For example, hay balers use belts to form hay into a bale. In a typical round, hay baler, eight to fifteen rollers support four to eight individual belts, each of which is typically about 40 feet long.

Rigorous demands are placed on belting used in round, hay balers. These belts serve not only as conveying media, but also as size restrictors and compaction devices. This rigorous service is in sharp contrast to the service performed by the more prevalent conveyor belt. The conveyor belt is generally limited to service as a carrying and actuating medium.

The most common type of belt used in hay balers today is a three-ply belt, such as the belt disclosed in U.S. Pat. No. 4,371,580 (Morrison, et al.). The belt typically is comprised of three fabric plies coupled by two inner rubber skims that form the belt core and two outer rubber skims that protect the core surfaces. A brief description of the three-ply belt's conventional manufacturing technique is in order. First, large sheets of fabric for the center ply and the outer plies are primed with a bonding chemical such as resorcinol formaldehyde latex (RFL). Uncured inner rubber skims and outer rubber covers are then alternated with the fabric sheets. The plied sheets are then vulcanized to form the appropriate bonds, and the belts are cut to the appropriate lengths and widths from the large three-ply sheet.

The most common method of belt production from large processed sheets such as the three-ply sheet mentioned above is the 'cut-edge' belt method. The belts are produced by slitting the large sheets of processed material into individual belts of the proper width. This exposes the edges of the fabric plies that form the core of the belt. The belt ends of the individual belts are then fastened together to produce continuous, cut-edge, loop belts. While these loop belts have been well received, they are not without problems.

A first such problem lies in the fact that the longitudinal edges of the belts produced by the cut-edge method tend to delaminate when the belts are subjected to the loads and stresses of a hay-baling operation. This delamination along the longitudinal edges contributes to deterioration of the means used to fasten the ends of the belt together, especially along the longitudinal edges.

A second problem with cut-edge belting is caused by uneven infeeding of the crop into the baler. The crop pushes material into the side of the belt thus tending to force the belt off a straight path of travel. This causes the edges of the belt to wear excessively, and the wear becomes progressively worse with use.

Moreover, the edges of cut-edge belts and other types of belts tend to curl up against the mechanical guides on the rollers. This curling induces an even greater amount of stress and flexion at the edges of the belt and, thus, contributes to accelerated fatigue at the edges of the belt.

A common problem with all current hay baler belts results from the heavy loads they are subjected to as they travel around the rollers when baling. The belt edges tend to stretch more than the center of the belt. This is due, at least in part, to an unbalance of load or force dissipation as the load shifts off the belt's center. This unbalanced load results from the gaps between the belts in the hay baler. When the belts are acting as compressors on the hay bale, the hay tends to bulge out between the gaps resulting in greater stress on the edges of the belt and thus greater elongation.

Another common problem with available belting is belt rollover. Current belts deform along the leading edge of a sideward moving belt. This deformation tends to brake the belt along the leading edge, causing the leading edge to roll under and the rest of the belt to roll over this leading edge. This roll-over results in detrimental elongation of the belt edge which interferes with proper baler operation and contributes to deterioration of the belt.

The current methods of attaching belt ends to form continuous loop belts also create problems within the belts. The ends of cut-edge and other belts are typically joined by one of two methods. In a first method, mechanical fasteners are used to join the ends of each belt to form an endless belt. A commonly used mechanical fastener known as a "clipper lace" splice is described in U.S. Pat. No. 4,371,580 (Morrison, et al.), incorporated herein by reference. A clipper lace splice includes a plurality of metal eyelets that are connected to each end of the belt. When the eyelets on each end of the belt are aligned with one another, a rod or other suitable retaining material is passed through the eyelets. The ends of the rod are suitably formed to prevent removal of the rod so that the splice remains intact.

The mechanical fasteners tend to deteriorate belts in several ways. First, the mechanical fasteners tend to wear and fail at a faster rate along the longitudinal edges of the belts because of the force exerted on the belt edge by the hay bales. If a mechanical fastener on a hay baler fails, the belt must be replaced before the hay baler can continue operating.

Second, because of the excessive wear on the outer-edge fasteners, they are damaged and effectively lost. This damage puts the central fasteners under greater tension which, in turn, can cause damage to these fasteners, or greater wear on the fabric retaining the fasteners, to the point of failure.

Morrison U.S. Pat. No. 4,279,676, incorporated herein by reference, discloses a second method for joining the ends of cut-edge and other belts. This method solves some of the retention problems associated with mechanical fasteners by splicing the ends of the belt to form an endless loop. While the endless splice has proven successful in improving the reliability of the fastened belt, the increased cost of the endless splice has slowed its acceptance in the industry.

Arnold U.S. patent application Ser. No. 07/77,792, filed Oct. 17, 1991, and incorporated herein by reference, discloses a folded-edge belt so named because the fabric core consists of one strip of fabric that is folded to form the belt plies. The folded-edge belt has an increased cross-sectional modulus of elasticity at the folds in the fabric, increased transverse stiffness, and a simplified splicing angle that produces three fabric edges that can be spliced at different angles. This construction creates superior hay baler belts that combine all of the desirable characteristics of the previous art belts. However, it has been observed that even these belts are adversely affected by certain extreme conditions. Extremely dry and dusty or extremely wet and slippery crop conditions still tend to promote belt roll-over and consequent possible damage to fasteners on the longitudinal edges.

One suggested solution for several of the problems associated with cut-edge belts and mechanical fasteners has been to put a rubber cap on the exposed edges of the belts. This solution was disclosed in U.S. Pat. Nos. 4,900,609 (Arnold) and 4,371,580 (Morrison et al.). This rubber cap has consisted of the same material used on the outer surfaces of the belt. The cap has helped slow down wear on the inner, fabric plies that were exposed in cut-edge belts. It has also provided shock resistance for the mechanical fasteners such as when the belt comes into contact with the mechanical guides.

SUMMARY OF THE INVENTION

The present invention is directed at reducing or overcoming belting problems faced by the industry, especially the problems set forth above. The invention is based in part on the reasons for these problems. Thus, the problems have been found to be due in large part to a uniform cross-sectional modulus of elasticity that exists between the belt ends and also to the cut edges of the belts. It has further been observed that, with usage, a cut-edge belt experiences a decrease in its cross-sectional modulus of elasticity from the longitudinal centerline of the belt outward to each edge. This decrease, it has been discovered, tends to occur when the load on the belt shifts off the centerline, thereby causing an unbalance of load or force dissipation. The resulting decrease in the cross-sectional modulus accelerates deterioration of the belt.

Studies of various belt designs helped to identify and confirm the above observations and conclusions. The studies also led to the present invention in the form of belting which has buttressed edges. Buttressing the edges increases the cross-sectional modulus of elasticity of the buttressed edge region relative to the central portions of the belt. Preferably, the buttressing also seals the edges so as to protect the belting from moisture, dirt, oxidation and the like.

Thus, the present invention provides belting which exhibits superior transverse impact strength, greatly decreases the incidence of belt roll over, inhibits deterioration due to strain and stress, inhibits elongation of belt edges, and resists deformation when moving sideward along the face of a rotating roller. The belting is particularly useful in agricultural applications and especially in round, hay balers.

The invention in a broad aspect relates to a belt comprising a belt core having opposed surfaces and opposed longitudinal edges and buttressed edges that cause the buttressed regions of the completed belt to have a higher modulus of elasticity than the center of the completed belt.

In one preferred embodiment, the buttressed edges comprise edge wraps or separate fabric strips which are wrapped around the outer, longitudinal edges of a belt core. This additional fabric increases the rigidity of the edges which causes the modulus of the completed belt to be greater in the wrapped region. The belt core and edge wrap are then covered by an elastomer that protects the core and aids in the baling operation. This increase in fabric mass along the edges of the belt aids in maintaining mechanical fastener reliability. It also reinforces an endless belt's overlap of fabric in the splice region. Furthermore, the additional fabric has reduced the elongation of the wrapped region by about 200 percent over previous belts including the folded-edge belt. The folded-edge belt is an improvement over previous belts but only has about a 50 percent decrease in elongation of the very edge of the belt.

In another preferred embodiment, the buttressed edges comprise elastomeric caps. The belt core is encapsulated with an elastomeric cover that causes the edge region of the belt to have a higher modulus than the center region. This change in modulus is caused by covering the edge region with a harder elastomer than that used to cover the central region of the belt core. This process makes the edge of the belt more rigid relative to the center which helps to prevent excessive wear on a belt edge. The higher modulus elastomer also tends to be more abrasive resistant, thereby lasting longer and helping to prevent slippage along the belt rollers. Thus, the belt is less likely to rub against the mechanical guides. The cap also helps to protect the belt core fabric that is otherwise exposed in cut-edge belting.

In yet another preferred embodiment, the buttressed edges comprise strips of fabric and elastomeric caps. This embodiment combines both embodiments described above resulting in a belt with edge wrap and a dual elastomer encapsulation.

It has been found that the increased modulus of the outer edge regions of a belt improves performance by reducing the tendency of the belt to flip or roll over and also by facilitating the sideward slippage along any given roller surface. The increased modulus further counteracts the negative effects of stress and strain along the belt edges that otherwise tend to deteriorate the belt. The stiffer edges also help to protect the fastening system used to join the belt ends.

BRIEF DESCRIPTION OF THE DRAWINGS

In the accompanying drawings:

FIG. 2A is a perspective, sectional, partially cutaway view of encapsulated belting in accordance with the present invention.

FIG. 2B is a cross-sectional view of the encapsulated belting illustrated in FIG. 2B.

FIG. 2C is a cross-sectional view of an alternative embodiment of the encapsulated belting illustrated in FIG. 2A.

DETAILED DESCRIPTION OF THE INVENTION

The present invention can take many forms and embodiments. The embodiments herein described are intended to explain and illustrate the invention without limiting it.

Figure 1A:
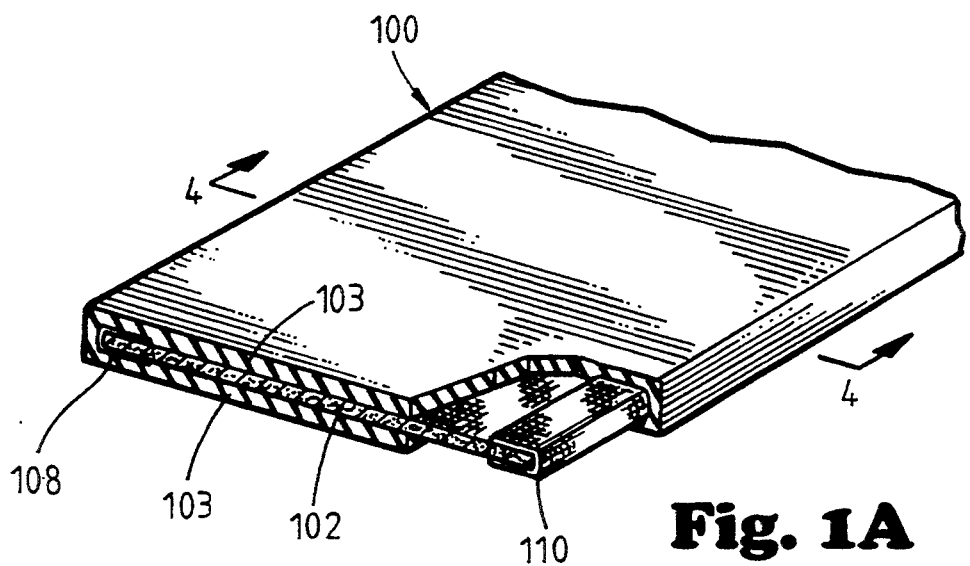
FIG. 1A is a perspective, sectional, partially cutaway view of edge-wrapped belting in accordance with the present invention.
Figure 1B:
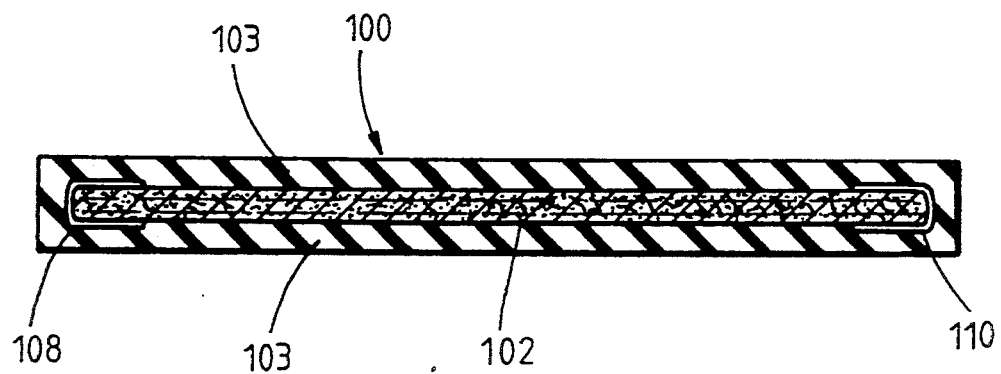
FIG. 1B is a cross-sectional view of the edge-wrapped belting illustrated in FIG. 1A.

FIGS. 1A and 1B illustrate belting 100 in accordance with the present invention. As shown, the belting 100 includes a belt core 102 which may be of many types but which typically has a uniform cross-sectional modulus of elasticity across the width of the belt core. A belt core is commonly made of one or more strips of fabric.

These strips are normally calendered with an elastomer and plied together if a multiple fabric-ply belt is to be made. Alternatively, the belt core 102 may comprise a thermoplastic material which includes a fabric coated with a plastisol. The belt core 102 may also be extruded with a power thermoset material or thermoplastic material.

Presently, the most common type of belt core is the three-ply cut-edge belt core like that disclosed in U.S. Pat. No. 4,900,609 (Arnold). The present invention has been found to be very beneficial when used with such belt cores.

The belt 100 is made by wrapping the longitudinal edges of the belt core 102 with pieces of fabric, preferably in the form of edge wraps 108 and 110. This is preferably done by applying an adhesive to the edge wraps and positioning edge wraps 108 and 110 with direct pressure. A belt with edge wraps that cover up to about forty percent of the entire belt core's opposing flat surfaces has been found to be economically efficient while still exhibiting the desired characteristics of the present invention. It should be noted that at least a portion of the center of the belt needs to have the lower modulus of elasticity to aid the baler in driving belts.

Preferred edge-wrap materials have been found to be similar to materials used for bead wrap in the tire industry to reinforce the bead of a tire. The materials are preferably fabrics made of fibers such as polyesters, polyvinyl acetate, fiberglass, polyamids such as Nylon (registered mark of Du Pont) or aramids such as Kevlar (registered mark of Du Pont). The edge wrap material is preferably treated with an adhesive that will bond to the elastomer used to bond the fabric plies together. Resorcinol formaldehyde latex (RFL) has been found to be very effective when the fabric core is made of thermoplastic fibers. Silane adhesives have similarly been found to be especially effective when the fabric core is made of glass fibers.

The edge wraps may be made of woven or nonwoven fabrics of the same fibers and adhesives listed above. Woven fabrics are preferred, especially with an open weave. Leno-type woven fiberglass fabrics are especially contemplated. If the roller diameters are in excess of 3.0-3.5 inches, the edge wrap may even be an adhesive-treated, woven metal cloth.

After the belt core 102 has been buttressed with edge wraps 108 and 110, it is then subjected to another plying process where an outer cover 103 of the same or different elastomer used in the belt core 102 is applied to protect the inner fabric belt core. The outer cover 103 is preferably applied by crosshead extrusion.

FIGS. 2A and 2B illustrate belting 200 in accordance with the present invention which comprises a preferred embodiment of the invention known as encapsulated belting. The belt core 202 may be the same as the belt core 102 in FIG. 1A.

The belt core 202 of FIGS. 2A and 2B is subjected to a plying process which completely coats the belt core 202 with an encapsulating outer cover 203 of the same or different elastomer used in plying the belt core 202. The outer cover 203 includes outer skims 204 and 206 and caps 208 and 210. In this embodiment the belt core longitudinal edges 212 and 214 are buttressed by caps 208 and 210 comprising a harder elastomer than the elastomer used for the outer skims 204 and 206. As an example, if the hardness of the outer skims 204 and 206 is in the range of 55-70 Shore A, the hardness of the caps 208 and 210 should typically be about 70-80 Shore A. The result of applying these different elastomers is that the elasticity modulus of the belt edge region covered by the harder elastomer becomes greater than the modulus of the belt center.

It will be noted at this point that elastomers typically increase in cost as they increase in hardness. Thus, to attain the benefits of the invention, the embodiment of FIG. 2A is economically efficient typically for lighter load or lighter tensional applications. Economic efficiency for hay baler applications that involve heavy loads and tensions is more easily reached with the embodiment shown in FIG. 3A discussed below.

The caps 208 and 210 may be applied only to the very edge of the belt core 202; however, to enhance bonding of the different elastomers used in the caps 208 and 210 and skims 204 and 206, the elastomer of the caps should preferably extend in decreasing thickness toward the center of the belt 200. Two alternative embodiments are illustrated in FIGS. 2B and 2C. Preferably, the elastomer of each cap should extend over about 30 percent of each opposing flat surface of the belt core 202. Furthermore, preferably up to about 70 percent of the belt 200 should have a lower modulus of elasticity to aid the hay baler in driving the belts.

The process of applying the outer cover 203 is preferably accomplished by crosshead extrusion, wherein belt core 202 is passed through a crosshead that is capable of extruding at least two different elastomers in the same process. It is important that the various elastomers be able to bond to all of the constituents of the belt core.

Figure 3A:
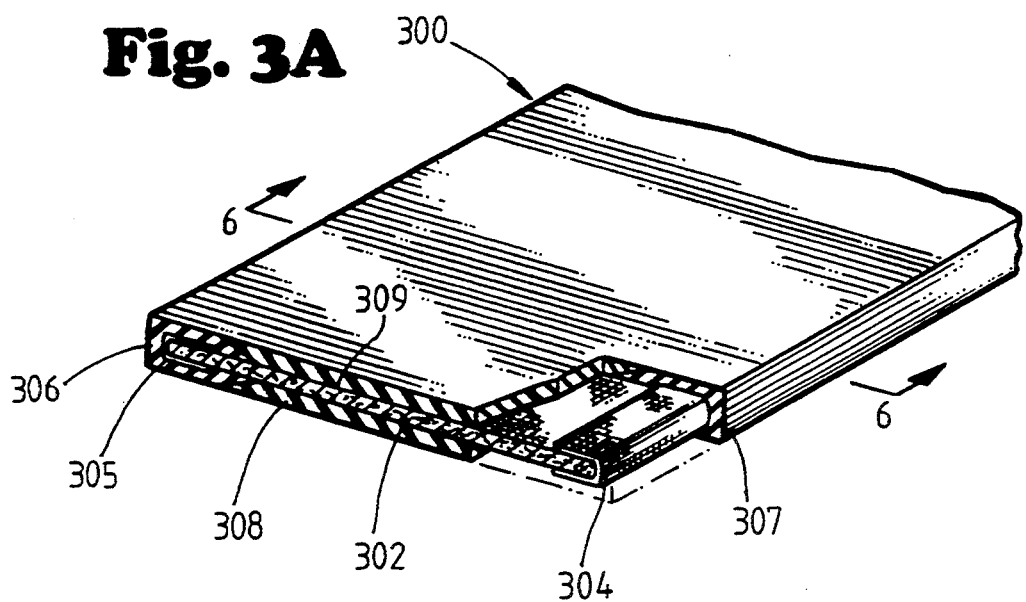
FIG. 3A is a perspective, sectional, partially cutaway view of encapsulated, edge-wrapped belting in accordance with the present invention.
Figure 3B:
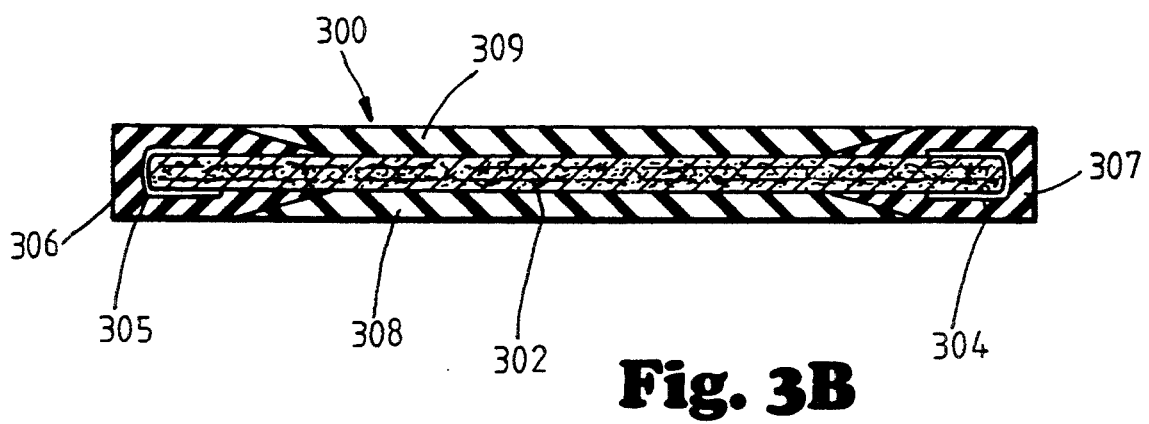
FIG. 3B is a cross-sectional view of the encapsulated, edge-wrapped belting illustrated in FIG. 3A.

The belting of FIGS. 3A and 3B combine the advantages of the wrapped belting of FIG. 1A and the advantages of the encapsulated belting of FIG. 2A. First, edge wraps 304 and 305 are applied to the belt core 302 as in the embodiment of FIG. 1A, discussed above. Then, caps 306 and 307 and outer skims 308 and 309 are applied to the belt core 302 and edge wraps 304 and 305 to form a complete encapsulation as described in the embodiment of FIG. 2A, discussed above. As discussed in reference to FIG. 2A, the hardness of the elastomer of the caps 306 and 307 should be greater than the hardness of the elastomer of the outer skims 308 and 309.

As an example of a preferred embodiment, the belt core 302 comprises three fabric plies of woven Nylon and polyester fibers. The fabric plies are joined by an elastomer of thermoset synthetic rubber. The edge wraps 304 and 305 comprise a Nylon fabric and are treated with an adhesive comprising a solvated natural rubber and an additive to give the rubber an adhesive quality. This additive is preferably Chemlok 402 made by Lord Corporation. Preferably, each edge wrap covers about 10 percent of each of the belt core's flat surfaces. The belt core 302 and edge wraps 304 and 305 are then preferably encapsulated by crosshead extrusion of two different elastomers. The outer skims 308 and 309 should preferably be in the range of 60-70 Shore A while the caps 306 and 307 should be about 80 Shore A. The elastomer is preferably thermoset synthetic robber. The belts are typically cured by vulcanization under a pressure of approximately 50 lbs./in.$^2$ or greater and at a temperature of approximately 280 degrees Fahrenheit for about 10 to 60 minutes.

What is claimed is:

1. Belting which comprises:
   an elastomeric belt core having two opposing surfaces and two opposing longitudinal edges; and
   buttressing end caps extending along each of said longitudinal edges and across a portion of each of said opposing surfaces to define two opposed buttressed regions of the belting and a center region of the belting between said buttressed regions, said buttressed regions having a given modulus of elasticity and said center region having a given modulus of elasticity, said modulus of elasticity of said buttressed regions being greater than said modulus of elasticity of said center region.

2. Belting as defined in claim 1 wherein the belt core comprises at least one ply of a fabric.

3. Belting as defined in claim 1 wherein the buttressing end caps comprise fabric strips.

4. Belting as defined in claim 3 which further comprises an adhesive, said adhesive bonding said fabric strips to said belt core.

5. Belting as defined in claim 3 further comprising an elastomer covering said buttressing end caps and said belt core.

6. Belting as defined in claim 5 which further comprises adhesive, said adhesive bonding said fabric strips to said belt core.

7. Belting as defined in claim 1 wherein said buttressing end caps comprise elastomeric caps having a first hardness.

8. Belting as defined in claim 7 further comprising elastomeric outer skims having a second hardness that is less than said first hardness of said elastomeric caps, said outer skims covering each opposing surface of said belt core between said buttressing end caps.

9. Belting as defined in claim 8 wherein the belt core comprises at least one ply of a fabric.

10. Belting as defined in claim 3 wherein said buttressing end caps further comprise elastomeric caps having a first hardness and being disposed over said fabric strip.

11. Belting as defined in claim 10 which further comprises an adhesive, said adhesive bonding the fabric strips to said belt core.

12. Belting as defined in claim 10 further comprising outer elastomeric skims having a second hardness that is less than said first hardness of said elastomeric caps, said outer skims covering each opposing surface of said belt core between said elastomeric caps.

13. Belting as defined in claim 12 wherein said belt core comprises at least one ply of a fabric.

14. Belting which comprises:
an elastomeric belt core having two opposing surfaces and two opposing longitudinal edges;
fabric extending along the longitudinal edges and laterally over an edge portion of each of said opposing surfaces;
elastomeric caps extending along the longitudinal edges of said belt core and covering said fabric and defining longitudinal end regions having a first modulus of elasticity;
elastomeric outer skims extending along and covering each said opposing surface of said belt core, said outer skims and said belt core defining a longitudinal central region having a second modulus of elasticity, said second modulus of elasticity being less than said first modulus of elasticity.

15. Belting as defined in claim 14 which further comprises an adhesive, said adhesive bonding said fabric to said belt core.

16. Belting as defined in claim 15 wherein said belt core comprises at least one ply of fabric.

17. Belting which comprises:

an elastomeric belt core having two opposing surfaces and two opposing longitudinal edges, said belt core comprising at least one fabric ply;
a fabric strip bonded to and extending along each respective longitudinal edge and laterally over a portion of each of said opposing surfaces, each of said fabric strips covering up to about 40 percent of each of said opposing surfaces and defining buttressed longitudinal edge regions and a central region; and
an elastomeric cover encapsulating said belt core and said fabric strips, wherein said buttressed longitudinal edge regions have a first modulus of elasticity and said central region has a second modulus of elasticity, said first modulus of elasticity being greater than said second modulus of elasticity.

18. Belting as defined in claim 17 wherein said elastomeric cover comprises a thermoset synthetic rubber.

19. Belting as defined in claim 18 which further comprises a solvated natural rubber adhesive bonding said fabric strips to said opposing surfaces.

20. Belting which comprises:
an elastomeric belt core having two opposing surfaces and two opposing longitudinal edges, said belt core being comprised of at least one fabric ply and an elastomeric ply;
a separate fabric strip extending along each respective longitudinal edge and laterally over a first edge portion of each of said opposing surface up to about 40 percent, said fabric strips being adhesively bonded to said core;
a discrete elastomeric cap extending along each respective longitudinal edge of said belt core and covering at least a portion of said respective fabric strip to define an opposing longitudinal belt edge region along each respective longitudinal edge; and
an outer skim covering each of said opposing surface of said belt core between said caps to define a central region disposed between said opposing longitudinal belt edge regions, said longitudinal belt edge regions having a given modulus of elasticity and said central region having a given modulus of elasticity, said modulus of elasticity of said longitudinal belt edge region being greater than said modulus of elasticity of said central region.

21. Belting as defined in claim 20 wherein each said elastomeric cap extends laterally over each said second edge portion of each said opposing surface up to about 30 percent.

22. Belting as defined in claim 20 wherein each of said elastomeric caps has a hardness of about 70 to 80 Shore A, and said outer skims comprise an elastomer having a hardness of about 55 to 70 Shore A.

23. Belting as defined in claim 20, wherein said fabric comprises open weave synthetic fibers.

24. Belting as defined in claim 23 wherein said caps and said skims comprise thermoset synthetic rubber.

25. Belting as defined in claim 24 wherein said elastomeric ply of said belt core comprises thermoset synthetic rubber.

26. Belting as defined in claim 25 which further comprises a solvated natural rubber adhesive bonding said fabric strips to said opposing surfaces.

27. A belt comprising:
an elastomeric core having a two opposed surfaces bounded by a first longitudinal edge and a second longitudinal edge;

a first inner end cap extending along said first longitudinal edge and having a first hardness;

a second inner end cap extending along said second longitudinal edge and having a second hardness; and a material disposed between said first end cap and said second end cap on each of said opposed surfaces and having a third hardness, said third hardness being less than said first hardness and being less than said second hardness.

28. The belt, as set forth in claim 27, wherein said material encompasses said first end cap and said second end cap.

29. The belt, as set forth in claim 27, further comprising a first outer end cap and second outer end cap abutting said material and encompassing said first inner end cap and said second inner end cap respectively.

30. A belt comprising:

an elastomeric core having a two opposed surfaces bounded by a first longitudinal edge and a second longitudinal edge;

a first end cap extending along said first longitudinal edge to form a first buttressed region having a first modulus of elasticity;

a second end cap extending along said second longitudinal edge to form a second buttressed region having a second modulus of elasticity; and a material encompassing said first buttressed region and said second buttressed region and each of said opposed surfaces to form a center region having a third modulus of elasticity, said third modulus of elasticity being less than said first modulus of elasticity and being less than said second modulus of elasticity.

* * * * *